Patented June 22, 1943

UNITED STATES PATENT OFFICE 2,322,670

RESINOUS POLYMERIC MATERIAL

William J. Sparks, Elizabeth, and Donald C. Field, Berlant Park, N. J., assignors to Standard Oil Development Company, a corporation of Delaware No Drawing. Application December 14, 1940, Serial No. 370,133

4 Claims. (Cl. 260—2)

This invention relates to solid, thermoplastic, synthetic substances; relates particularly to polymeric-condensation substances; and relates especially to synthetic resins produced by the simultaneous condensation and polymerization of chloro-aromatic substances with tertiary alkyl-halides.

One of the standard, well-known condensation reactions is the so-called "Friedel-Crafts synthesis" by which the respective molecules of an alkyl halide are condensed with the respective molecules of an aromatic hydrocarbon through the elimination of hydrogen chloride, the reaction being catalyzed by solid aluminum chloride at room temperature to yield molecules of a new substance in which the molecular weight is the sum of the respective molecules of alkyl halide and the aromatic, minus the molecular weight of hydrogen chloride. Another newer but relatively well-known reaction is the polymerization of iso-olefins (such as isobutylene) at low temperature by the application of Friedel-Crafts type catalysts, such as for example aluminum bromide, aluminum chloride, titanium tetrachloride and the like, including boron trifluoride. It has been found, however, that aluminum chloride is especially preferred and particularly advantageous results are obtained when aluminum chloride is used in the presence of saturated primary alkyl halides, to yield a very high molecular weight polymer without the elimination of any portion of any of the reacting molecules, the resulting polymer usually being a substance of very high molecular weight ranging from 1000 to 350,000 or above. The polymers so obtained are substantially saturated hydrocarbon substances which are soluble in hydrocarbon liquids, but insoluble in most other liquids and inert with respect to most substances except the free halogens or active halogen-containing substances such as sulphur chloride at elevated temperatures.

It is now found that by the use of a very particular, special catalyst, these two reactions can be combined. According to this invention an aromatic halide and a tertiary chlorohydrocarbon are simultaneously condensed and interpolymerized by the application of aluminum chloride in solution at low temperature, to yield a resinous substance which is thermoplastic and has a substantial elasticity and flexibility.

Thus, the invention consists in the process of simultaneously condensing and polymerizing an aromatic halide substance with a tertiary chlorohydrocarbon, and in the resulting resin obtained from the reaction. Other objects and details of the invention will be apparent from the following description.

In practicing the invention, mixtures of an aromatic halide such as benzyl chloride, benzal chloride or benzoyl chloride and similar aromatic chlorine substituted compounds including the various chlor-naphthalenes and the like with a tertiary alkyl halide such as a tertiary butyl chloride, or the tertiary amylene and hexylene chloro compounds (of the type prepared by the reaction between hydrogen chloride and olefin) are prepared at a low temperature ranging from $-10°$ C. to $-100°$ C. or lower, preferably in the presence of a refrigerant such as solid carbon dioxide, or in the presence of a diluent-refrigerant such as liquid propane, liquid ethane, liquid ethylene or similar inert, low boiling, liquid hydrocarbons. The mixture is then treated with a catalyst consisting of a solution of aluminum chloride or aluminum-halide-containing-substance in a low freezing solvent such as the alkyl halides, including ethyl chloride and methyl chloride or in carbon disulfide or other low freezing solvent. The mixture of aromatic halide and tertiary alkyl halide may consist of equimolecular portions of the two substances, or the proportions may be varied in either direction to include predominant quantities of either the aromatic chloride or the tertiary alkyl halide. The diluent-refrigerant is preferably present in amounts ranging from equal volumes up to 4, 5 or even 6 volumes of the diluent refrigerant per volume of mixed reactants. The catalyst preferably is in the form of a solution containing from 0.2% of aluminum chloride to saturation at 6 or 7% and is preferably present in the proportion from $\frac{1}{10}$ volume to 1 or 1½ volumes per volume of the mixed reactants, depending upon the concentration of the catalyst solution and the characteristics of the reactant mixture.

When the catalyst solution is added to the cooled reactant mix, a rapid reaction occurs with the liberation of hydrogen chloride and heat. The reaction simultaneously condenses the aromatic halide and the tertiary alkyl halide and polymerizes the substances into a very high molecular weight interpolymer of the condensates.

Example 1

A mixture consisting of 10 parts by volume of benzyl chloride and 50 parts by volume of tertiary butyl chloride were mixed with an excess of liquid propane to attain a temperature of $-45°$ C. To this mixture there were added approximately 10 volumes of a solution of aluminum chloride in ethyl chloride, the solution containing approximately 2% of aluminum chloride. The reaction proceeded vigorously with evolution of hydrogen chloride. At the close of the reaction the solid product was separated from residual portions of reactants, catalyst solution and diluent-refrigerant, washed with alcohol and dried. It was a light yellow, powdery substance insoluble in lubricating or heavy oil in the cold, thermoplastic and somewhat soluble in light hydrocarbon solvents. A proximate analysis showed that it contained about 14% of butane in the combined form. This resin also is flexible in film form.

The reaction is a general one between the aromatic halides in general and the tertiary alkyl halides.

*Example 2*

A mixture consisting of approximately 10 parts by volume of benzyl chloride with about 10 parts by volume of iso-propyl chloride was prepared and cooled to a temperature of approximately —15 °C. To this mixture there were then added approximately 10 parts by volume of a solution of aluminum chloride in ethyl chloride, the solution containing approximately 2% of aluminum chloride. The reaction proceeded rapidly with the evolution of a considerable amount of heat of reaction, and with the evolution of substantial quantities of hydrogen chloride. At the close of the reaction, the solid product was separated from the catalyst solvent, and residual traces of reactants, washed with alcohol and dried. The product was a granular solid, very slightly soluble in heavy oils, somewhat soluble in the light hydrocarbon solvents and thermoplastic. A proximate analysis showed that it contained substantial portions of pentane in the combined form, and the molecular weight, as determined by the Staudinger method, was found to be considerably above 1000.

The invention is similarly applicable to analogous mixtures of tertiary amyl chloride with benzol chloride and this reaction, especially in the presence of methyl chloride as diluent refrigerant, and as solvent for the aluminum chloride, proceeds similarly to yield analogous solid resin of similar high molecular weight.

Similarly the reaction proceeds equally well with corresponding mixtures containing benzal chloride with tertiary butyl chloride at similar reduced temperatures, preferably below —20° C., conveniently at the temperature set by solid carbon dioxide at —78° C. to yield a similar solid resin.

Similar reactions proceed with benzyl chloride in analogous mixtures with tertiary amyl chloride and with tertiary hexyl chloride.

The same reaction proceeds readily with benzoyl chloride in similar mixtures with tertiary butyl chloride, tertiary amyl chloride or tertiary hexyl chloride.

The reaction proceeds similarly with corresponding mixtures containing the various naphthyl, naphthal, and the analogous compounds in corresponding mixtures with tertiary butyl chloride or the tertiary amyl chloride, or tertiary hexyl chloride.

Alternatively various mixtures of the respective reactants may be used, i. e., mixtures of benzyl and benzal chloride may be prepared with mixtures of tertiary butyl chloride, with or without still other of the above mentioned reactants, and the reaction proceeds similarly to yield analogous multi-component hetero-polymer resins of similar high molecular weight compositions.

All of these and analogous resinous substances are particularly advantageous and desirable for such uses as molding compositions, surface coatings, can liners, container liners, for the preparation of proofed fabric such as cloth, paper and Cellophane; for the treatment of leather and pressed insulation board, as an adhesive for preparing laminated materials and for sealing compounds generally. The substances are compatible with and may be compounded with polyisobutylene substances (Vistanex polybutene), with chlorinated polyisobutylene, with the hard resins such as phenol and formaldehyde plastics of the type of Bakelite; with polyisoprene, with rubber, with the ethylene-dichloride-sodium tetrasulfide plastic known as "Thiokol," with gelatinous substances, with waxes, etc.

The reaction as above disclosed is a general one applicable to olefinic substances which contain removable hydrogen together with substances which contain removable chlorine to permit of the simultaneous production of a Friedel-Crafts condensation reaction and a polymerization reaction. The reaction, however, appears to be dependent upon the use of the particularly powerful catalyst consisting of aluminum chloride dissolved in a low freezing solvent, and in some instances the concentration of the aluminum chloride in the solvent and the ratio of catalyst solution to reactants are found both to be critical, although the critical points vary with the reactants, depending upon the ease with which the reaction occurs.

Thus, the invention consists in the simultaneous condensation and polymerization of a mixture of an aromatic halide and a tertiary chloro-olefin by the application thereto of a powerful Friedel-Crafts type catalyst in solution in a low freezing solvent at a temperature below about —10° C. to produce a high molecular weight thermoplastic, flexible resin.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

We claim:

1. The process for preparing a high molecular weight interpolymerizate-condensate resin comprising the steps of bringing together an aromatic chloride and a tertiary alkyl halide at a temperature below about 0° C. in the presence of a polymerization-condensation catalyst comprising aluminum chloride dissolved in a low freezing solvent having a freezing point below about 0° C.

2. The process of preparing a high molecular weight interpolymerizate-condensate resin comprising the steps of bringing together an aromatic chloride and tertiary butyl chloride at a temperature below about 0° C. in the presence of a polymerization-condensation catalyst comprising aluminum chloride dissolved in ethyl chloride.

3. The process of preparing a high molecular weight interpolymerizate-condensate resin comprising the steps of bringing together benzyl chloride and tertiary butyl chloride at a temperature below about 0° C. in the presence of a polymerization-condensation catalyst comprising aluminum chloride dissolved in ethyl chloride.

4. The process of preparing a high molecular weight interpolymerizate-condensate resin comprising the steps of bringing together benzal chloride and tertiary butyl chloride at a temperature below about 0° C. in the presence of a polymerization-condensation catalyst comprising aluminum chloride dissolved in ethyl chloride.

WILLIAM J. SPARKS.
DONALD C. FIELD.